(12) United States Patent
Morris

(10) Patent No.: US 10,150,130 B2
(45) Date of Patent: Dec. 11, 2018

(54) REPELLING PESTS, ANIMATE OR INANIMATE, WITH PROJECTILES

(71) Applicant: Frederick W. Morris, Gaithersburg, MD (US)

(72) Inventor: Frederick W. Morris, Gaithersburg, MD (US)

(*) Notice: Subject to any disclaimer, the term of this patent is extended or adjusted under 35 U.S.C. 154(b) by 0 days.

(21) Appl. No.: 15/610,712

(22) Filed: Jun. 1, 2017

(65) Prior Publication Data
US 2018/0015492 A1 Jan. 18, 2018

Related U.S. Application Data

(60) Provisional application No. 62/361,114, filed on Jul. 12, 2016.

(51) Int. Cl.
| | |
|---|---|
| *G08B 21/00* | (2006.01) |
| *B05B 12/12* | (2006.01) |
| *A01M 29/00* | (2011.01) |
| *A01M 31/00* | (2006.01) |
| *A01M 1/02* | (2006.01) |
| *A01M 7/00* | (2006.01) |

(Continued)

(52) U.S. Cl.
CPC ........... *B05B 12/122* (2013.01); *A01M 1/026* (2013.01); *A01M 7/0032* (2013.01); *A01M 7/0089* (2013.01); *A01M 29/00* (2013.01); *A01M 31/002* (2013.01); *B05B 1/08* (2013.01); *B05B 13/0426* (2013.01); *B05B 15/70* (2018.02); *G01S 13/08* (2013.01); *G01S 13/46* (2013.01); *G01S 15/08* (2013.01); *G01S 17/08* (2013.01); *H04W 84/12* (2013.01)

(58) Field of Classification Search
CPC .... A01M 1/026; A01M 29/00; A01M 31/002; A01M 7/0032; A01M 7/0089; B05B 12/122; B05B 13/0426; B05B 15/70; B05B 1/08
USPC ...................................................... 340/573.2
See application file for complete search history.

(56) References Cited

U.S. PATENT DOCUMENTS

| | | | | |
|---|---|---|---|---|
| 5,299,971 A | * | 4/1994 | Hart ................... | G08B 13/1963 180/167 |
| 5,585,626 A | | 12/1996 | Beck et al. | |

(Continued)

FOREIGN PATENT DOCUMENTS

| | | |
|---|---|---|
| WO | WO 2010/083053 | 7/2010 |
| WO | WO 2014/127094 | 8/2014 |

*Primary Examiner* — Mark Rushing
(74) *Attorney, Agent, or Firm* — Leveque IP law, P.C.

(57) ABSTRACT

A device for repelling pests includes a housing, a positioning mechanism to move the housing, at least three range-finding elements affixed to the housing along a common plane to detect a presence of a pest (e.g., an animate pest such as an animal, or an inanimate pest such as a drone) by obtaining a signal indicative of a location of the pest relative to the device, a projectile launcher affixed to the housing to fire one or more projectiles therefrom, and a controller electronically coupled to the range-finding elements, the positioning mechanism, and the projectile launcher. The controller may be configured to move the housing using the positioning mechanism until a strength of the signal obtained from each of the range-finding elements is substantially equal thereby indicating that the projectile launcher is directed toward the location of the pest, and to fire projectiles from the projectile launcher toward the pest.

20 Claims, 2 Drawing Sheets

(51) Int. Cl.
*B05B 1/08* (2006.01)
*B05B 13/04* (2006.01)
*B05B 15/70* (2018.01)
*H04W 84/12* (2009.01)
*G01S 13/08* (2006.01)
*G01S 15/08* (2006.01)
*G01S 17/08* (2006.01)
*G01S 13/46* (2006.01)

(56) References Cited

U.S. PATENT DOCUMENTS

| | | |
|---|---|---|
| 6,653,971 B1 | 11/2003 | Guice et al. |
| 6,853,328 B1 | 2/2005 | Guice et al. |
| 8,400,348 B1 | 3/2013 | Giuce et al. |
| 8,705,017 B2 | 4/2014 | Hyde et al. |
| 8,742,977 B1 | 6/2014 | Piesinger |
| 8,988,230 B2 | 3/2015 | Nohara et al. |
| 9,295,245 B1 | 3/2016 | Guice et al. |
| 9,335,413 B2 | 5/2016 | Weber-Grabau |
| 2006/0215885 A1 | 9/2006 | Kates |
| 2010/0201525 A1 | 8/2010 | Bahat et al. |
| 2013/0167429 A1 | 7/2013 | Tseng |
| 2014/0144389 A1 | 5/2014 | Richards |
| 2017/0231213 A1* | 8/2017 | Gordon ............... A01M 7/0089 43/132.1 |

* cited by examiner

REPELLING PESTS, ANIMATE OR INANIMATE, WITH PROJECTILES

CROSS-REFERENCE TO RELATED APPLICATIONS

This application claims the benefit of U.S. Provisional Patent Application No. 62/361,114 filed on Jul. 12, 2016, the entire content of which is hereby incorporated by reference.

BACKGROUND

Pests may be inanimate, such as a drone, or animate, such as birds or land animals. There remains a need for devices, systems, and methods to deter or repel pests from certain areas (e.g., outdoor areas) including without limitation airports, gardens, farm plots, decks, and patios.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
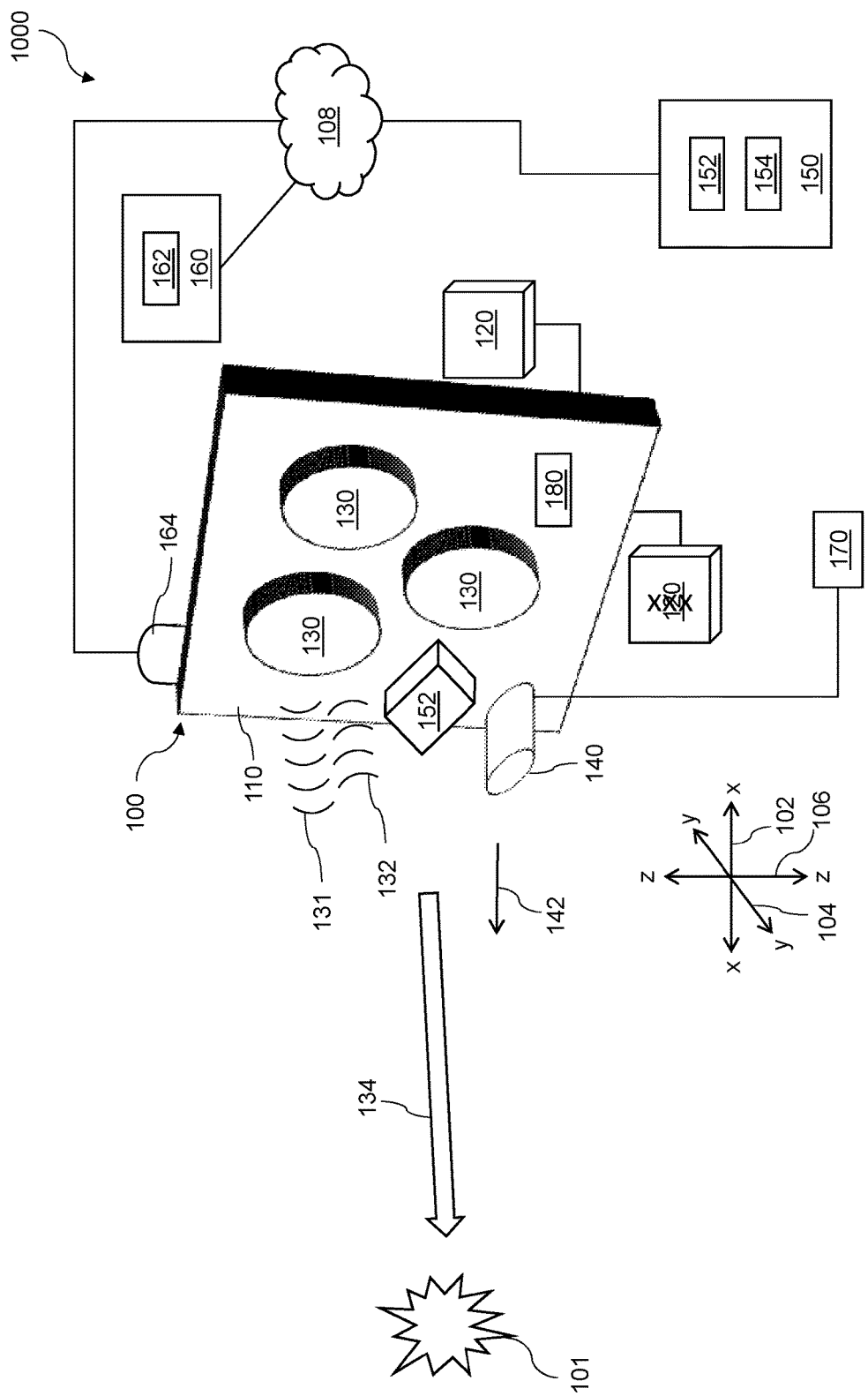
FIG. 1 illustrates a system featuring a device for repelling pests, in accordance with a representative embodiment.

The various methods, systems, apparatuses, and devices described herein generally provide for repelling pests, animate or inanimate.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, the repelling of pests, animate or inanimate. In certain aspects, the techniques described in this disclosure include, but are not limited to, use of devices that utilize sensors for detection and direction of a pest, and tools to annoy and repel pests.

Particular implementations described herein include, and may use, but are not limited to, a Program Integrated Circuit (PIC), a Field Programmable Gate Array (FPGA), a Digital Signal Processor (DSP), a Complex Programmable Logic Device (CPLD), an Application Specific Integrated Circuit (ASIC), a processor, and the like.

It is desirous for devices, systems, and methods to keep pests away from certain outdoor areas that include without limitation airports, gardens, farm plots, decks, patios, and the like. As described herein, a pest may be inanimate, such as a drone, or animate, such as birds of any type, and land animals of any type including without limitation squirrels, opossum, groundhogs, fox, deer, cats, dogs, insects, and the like. Thus, certain implementations may be thought of as "defensive" devices for deterring and keeping away pests. A goal of such a defensive device for animate pests may be to annoy the pests to the point where they proceed no further, and ideally are driven away. Such a device may be specifically designed to avoid inflicting harm on a pest. For inanimate pests, such as a drone, a goal may be to destabilize the drone's flight capability, e.g., with an objective of landing the drone. Such devices could be deployed in a defensive perimeter around an airport or the like, e.g., to deny access in or near aircraft flight paths. Such devices could also or instead be deployed in a defensive perimeter around a home, a farm, an office building, and so forth.

FIG. 1 illustrates a system featuring a device for repelling pests, in accordance with a representative embodiment. In general, the device 100 may use a targeting mechanism to aim a projectile 142 (e.g., water) at pests 101 to harass the pests 101. The device 100 may include a housing 110, a positioning mechanism 120, one or more range-finding elements 130, a projectile launcher 140, and a controller 150.

The housing 110 may be sized and shaped to hold one or more components of the device 100, e.g., components mounted on a common plane of the housing 110 or otherwise mounted on or within the housing 110. The common plane of the housing 110 may be a surface of the housing 110, e.g., a flat surface of the housing 110. The housing 110 may be positionable using the positioning mechanism 120, e.g., positionable to advantageously align components of the device 100 mounted on or within the housing 110. The housing 110 may be constructed of one or more of a metal, a plastic, a wood, a ceramic, a composite, and so forth. The housing 110 may include a linking mechanism such as one or more joints or hinges for engagement with the positioning mechanism 120, e.g., where the linking mechanism enables movement along one or more axes—e.g., along each of an x-axis 102, a y-axis 104, and a z-axis 106. It will be understood that, while an x, y, z coordinate system serves as a convenient basis for positioning within three dimensions, any other coordinate system or combination of coordinate systems may also or instead be employed, such as a positioning mechanism 120 that operates according to cylindrical or spherical coordinates.

The positioning mechanism 120 may be structurally configured to move the housing 110 along one or more of the x-axis 102, the y-axis 104, and the z-axis 106. The positioning mechanism 120 may include, without limitation, one or more of: linear actuators (or other actuators), valves, solenoids, motors, belts, pulleys, conveyors, gears, digital or analog signals to secondary systems, and so on. More generally, the positioning mechanism 120 may include without limitation various combinations of stepper motors, encoded DC motors, gears, belts, pulleys, worm gears, threads, and the like. For example, the positioning mechanism 120 may include a number of stepper motors to independently control a position of the device 100 along each of the x-axis 102, the y-axis 104, and the z-axis 106. Thus, in certain implementations, the housing 110 may be attached to, and move with, at least one of an x-axis positioner (that controls movement along the x-axis 102), a y-axis positioner (that controls movement along a y-axis 104), and a z-axis positioner (that controls movement along a z-axis 106) of the positioning mechanism 120. More generally, any arrangement of motors and other hardware, e.g., controllable by the controller 150, may serve as the positioning mechanism 120 in the device 100 described herein, and more generally, any arrangement suitable for controllably positioning the device 100 may be used herein.

The range-finding elements 130 may be configured to detect a presence of a pest 101 by obtaining a signal indicative of a location of the pest 101 relative to the device 100. Thus, in general, the range-finding elements 130 may be used to determine the position of the pest 101. For example, in certain implementations, one or more of the range-finding elements 130 send out a first signal 131 (e.g., a sensing signal), and receive a second signal 132 (e.g., feedback) that indicates a position of a pest 101.

As shown in the figure, in certain implementations, the device 100 includes at least three range-finding elements 130, although more or less range-finding elements 130 are certainly possible. The range-finding elements 130 may be affixed to the housing 110 along a common plane—e.g., disposed on a surface of the housing 110 as shown in the figure. In an implementation including at least three range-finding elements 130, the range-finding elements 130 may be aligned in a substantially triangular configuration on the housing 110 as shown in the figure, e.g., along the common plane. Other configurations are possible.

One or more of the range-finding elements 130 may include an ultrasonic sensor, where the signal obtained by the range-finding elements 130 (e.g., the second signal 132 shown in the figure) includes an ultrasonic signal. One or more of the range-finding elements 130 may also or instead include a Doppler radar or the like. The Doppler radar may be configured to detect rotating blades of a pest 101, e.g., in an implementation where the pest 101 is a drone or the like. One or more of the range-finding elements 130 may also or instead include a visible or infrared laser range-finding element, or other optical range-finding devices. One or more of the range-finding elements 130 may also or instead include a radio frequency (RF) range-finding element. It will be understood that a variety of range-finding elements 130 may be used for the device 100, and all are intended to be included within the scope of this disclosure.

For example, the range-finding elements 130 may also or instead include one or more of capacitive sensors, inductive sensors, ultrasonic sensors, optical sensors, infrared sensors, temperature sensors, sound sensors, chemical sensors (e.g., oxygen, carbon-dioxide, and so on), motion and proximity sensors, magnetic sensors, radio sensors, flow sensors, radiation sensors, imaging sensors, pressure sensors, shock sensors, force sensors, and the like. In general, the range-finding elements 130 may include a sensor to detect a presence or absence of an object at a predetermined location—e.g., the pest 101 within a defended area/volume. The range-finding elements 130 may also or instead include more complex sensing and processing systems or subsystems, such as a three-dimensional scanner using optical techniques (e.g., stereoscopic imaging, shape from motion imaging, and the like), structured light techniques, or any other suitable sensing and processing hardware that might extract information from a defended area/volume.

In certain implementations, such as that shown in FIG. 1, the device 100 may use at least three ultrasonic range-finding elements 130 to determine both the distance and the direction of the pest 101—e.g., the distance and direction relative to the device 100, and/or the direction of travel of the pest 101 when the pest 101 is moving. In an initial set up, the sensitivity of the range-finding elements 130 may be adjusted (e.g., the sensitivity may be adjusted by a user utilizing a user interface 162 of a computing device 160, or the sensitivity may be automatically adjusted by the controller 150). For example, the sensitivity of the range-finding elements 130 may be set to a no-pest background, e.g., a null background, during an initial set up. When the range-finding elements 130 receive a response above the null background, e.g., from the presence of a pest 101, the positioning mechanism 120 may turn the device 100 (via the housing 110) in both azimuth and elevation until a predetermined number of the range-finding elements 130 (e.g., all of the range-finding elements 130) are receiving substantially the same signal level, or the signal of the range-finding elements 130 is within a predetermined threshold or range. Receiving substantially the same signal level may indicate that the device 100 is pointed orthogonally towards the pest 101 (e.g., in the direction of arrow 134), and the device 100 (via the projectile launcher 140) may begin firing a projectile 142 such as a continuous stream of water, a pulsed stream of water, a continuous or pulsed stream of oil, or in the case of inanimate pests such as drones, small caliber pellets. For larger area defense of inanimate pests, the device 100 may sense a Doppler component to the return signal, which can indicate rotating blades, such as with a drone, or a property/parameter/feature that would not be indicated with an animate pest.

The projectile launcher 140 may be affixed to the housing 110 as shown in the figure. The projectile launcher 140 may be structurally configured to fire one or more projectiles 142 therefrom.

The projectile launcher 140 may be positioned on the housing 110 such that the position of the projectile launcher 140 relative to the range-finding elements 130 on the housing 110 is predetermined. In this manner, when a signal obtained from each of the range-finding elements 130 is substantially equal, the projectile launcher 140 may be in a predetermined configuration such as directed toward an origin of the signal, where the origin of the signal represents the location of a pest 101. The projectile launcher 140 may be aligned to fire one or more projectiles 142 substantially orthogonal to the common plane of the range-finding elements 130.

As discussed herein, a projectile 142 fired by the projectile launcher 140 may include a fluid (e.g., water, oil, air, and the like). For example, the projectile 142 may include one or more of a continuous stream of a fluid (e.g., a continuous stream of water, a continuous stream of oil, and so on), and a pulsed stream of a fluid (e.g., a pulsed stream of water, a pulsed stream of oil, and so on). To this end, the device 100 may include a supply 170 of the fluid. For example, the device 100 may include a water supply in engagement with the projectile launcher 140. The water supply may include a container, e.g., a fixed container or a movable container. The water supply may also or instead include another water source such as a piping system (e.g., through a garden hose or the like, or hard-piped to the device 100), a municipal water supply, a body of water or a waterway (e.g., a natural or man-made body of water), an irrigation canal, an irrigation water spigot, and so forth.

As discussed herein, the projectile 142 fired by the projectile launcher 140 may also or instead include a solid object—e.g., pellets or the like. Thus, the supply 170 may also or instead include a container of pellets or other solid objects used as the projectile 142.

In certain implementations, the device 100 may include a projectile launcher 140 in the form of a pulsed water pump with a water supply 170 and a nozzle that is aimed orthogonally away from the housing 110, e.g., the common plane in which the range-finding elements 130 are aligned. The pulsed water pump may be calibrated, e.g., with the range provided by the controller 150 using the range-finding elements 130, such that high-speed pulsed water is delivered to the distance/position that was sensed by the range-finding elements 130. In this manner, and in other implementations, the common plane may simplify the design of the device 100, since the common plane can align (in parallel) the pointing direction of the range-finding elements 130 with the projectile launcher 140. The common plane may also or instead simplify the calculations for aiming the device 100 at the pest 101, and the calibration to initially set up the device 100. This integration of the range-finding elements 130 with the projectile launcher 140, e.g., along a common plane, may also or instead eliminate a need for any interpolation of pointing information from a distant range-finding element to be used to aim the projectile launcher 140, such as those seen in large-scale military fire control radar systems.

The controller 150 may include, or otherwise be in communication with, a processor 152 and a memory 154. The controller 150 may be electronically coupled (e.g., wired or wirelessly) in a communicating relationship with one or more of the range-finding elements 130, the positioning mechanism 120, the projectile launcher 140, and other components of the device 100. In general, the controller 150 may be operable to control one or more of the components of the device 100.

The controller 150 may be configured to move the housing 110 using the positioning mechanism 120 along one or more of the x-axis 102, the y-axis 104, and the z-axis 106 until a strength of the signal obtained from each of the range-finding elements 130 is substantially equal. It will be understood that the strength of the signal obtained from each of the range-finding elements 130 being "substantially equal" as described herein may include that the signal obtained from each of the range-finding elements 130 is within a certain tolerance or range. The tolerance or range may be adjustable, automatically or manually. The strength of the signal obtained from each of the range-finding elements 130 being substantially equal may indicate that the projectile launcher 140 is directed toward the location of the pest 101. The controller 150 may be configured to fire one or more projectiles 142 from the projectile launcher 140 when the projectile launcher 140 is directed toward the location of the pest 101. For example, the controller 150 may be configured to fire one or more projectiles 142 from the projectile launcher 140 until each of the range-finding elements 130 receives a null response indicating an absence of the pest 101.

In general, the controller 150 may be electrically coupled in a communicating relationship, e.g., an electronic communication, with any of the components of the system 1000. In general, the controller 150 may be operable to control the components of the system 1000 or device 100, such as the range-finding elements 130, the positioning mechanism 120, and the projectile launcher 140. The controller 150 may include any combination of software and/or processing circuitry suitable for controlling the various components of the system 1000 described herein including without limitation processors, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 150 may include the processor 152 or other processing circuitry with sufficient computational power to provide related functions such as executing an operating system, providing a graphical user interface (e.g., to a display coupled to the controller 150 or another component of the system 1000), set and provide rules and instructions for operation of the device 100 or another component of the system 1000, convert sensed information into positioning or firing instructions, and operate a web server or otherwise host remote operators and/or activity through the communications interface 164 described below. In certain implementations, the controller 150 may include a printed circuit board, an Arduino controller or similar, a Raspberry Pi controller or the like, a prototyping board, or other computer related components.

The controller 150 may be a local controller disposed on the housing 110, or a remote controller 150 otherwise in communication with the device 100 and its components. For example, one or more of the controller 150 and a user interface 162 in communication with the controller 150 may be disposed on an external component (e.g., a computing device 160) in communication with the device 100 over a data network 108.

The processor 152 of the controller 150 may include an onboard processor for the device 100, e.g., mounted near the range-finding elements 130 as shown in FIG. 1. The processor 152 may also or instead be disposed on a separate computing device 160 that is connected to the device 100 through a data network 108, e.g., using the communications interface 164, which may include a Wi-Fi transmitter and receiver. The processor 152 may perform calculations for one or more of positioning the device 100 and firing the projectile 142. For example, the processor 152 may perform calculations for one or more of the following: aiming the device 100 at the pest 101, determining the location of the pest 101 (e.g., the distance to the pest 101), and so forth, where such calculations may be based on signals obtained by the range-finding elements 130. The processor 152 may continuously update the calculations until the pest 101 leaves a defended area.

The processor 152 may be any as described herein or otherwise known in the art. The processor 152 may be included on the controller 150, or it may be separate from the controller 150, e.g., it may be included on a computing device 160 in communication with the controller 150 or another component of the system 1000. In an implementation, the processor 152 is included on or in communication with a server that hosts an application for operating and controlling the system 1000.

The memory 154 may be any as described herein or otherwise known in the art. The memory 154 may contain computer code and may store data such as sequences of actuation or movement of the device 100, sequences for firing the device 100, and so on. The memory 154 may contain computer executable code stored thereon that provides instructions for the processor 154 for implementation. The memory 154 may include a non-transitory computer readable medium.

The device 100, or the system 1000 including the device 100, may include a computing device 160 in communication with one or more of the components of the system 1000 or device 100 including without limitation the controller 150. The computing device 160 may include a user interface 162, e.g., in communication with the controller 150. The user interface 162 may be used, e.g., to adjust a sensitivity of the range-finding elements 130. The user interface 162 may also or instead be used, e.g., to calibrate the device 100 such that, when the signal obtained from each of the range-finding elements 130 is substantially equal, a distance of the pest 101 from the projectile launcher 140 is known to be within a predetermined range of the projectile launcher 140.

The computing device 160 may include any devices within the system 1000 operated by operators or otherwise to manage, monitor, communicate with, or otherwise interact with other participants in the system 1000. This may include desktop computers, laptop computers, network computers, tablets, smartphones, smart watches, PDAs, or any other device that can participate in the system 1000 as contemplated herein. In an implementation, the computing device 160 (and a user interface 162 thereof) is integral with another participant in the system 1000.

The computing device 160 may generally provide a user interface 162, which may include a graphical user interface, a text or command line interface, a voice-controlled interface, and/or a gesture-based interface. In general, the user interface 162 may create a suitable display on the computing device 160 for operator interaction. In implementations, the user interface 162 may control operation of one or more of the components of the system 1000, as well as provide access to and communication with the controller 150, processor 152, and other resources.

The user interface 162 may be maintained by a locally executing application on the computing device 160 that receives data from one or more of the components of the system 1000 or other resources. In other embodiments, the user interface 162 may be remotely served and presented on a computing device 160, such as where the device 100 or controller 150 include a web server that provides information through one or more web pages or the like that can be displayed within a web browser or similar client executing on the computing device 160. In implementations, the user interface 162 may also or instead be provided by and/or disposed on another participant in the system 1000.

The data network 108 may be any network(s) or inter-network(s) suitable for communicating data and control information among participants in the system 1000. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 1000. The data network 108 may include wired or wireless networks, or any combination thereof. One skilled in the art will also recognize that the participants shown the system 1000 need not be connected by a data network 108, and thus can be configured to work in conjunction with other participants independent of the data network 108.

Communication over the data network 108, or other communication between components of the devices 100 or systems described herein, may be provided via one or more communications interfaces 164. The communications interface 164 may include, e.g., a Wi-Fi receiver and transmitter to allow the logic calculations to be performed on a separate computing device 160, rather than on the housing 110 with the range-finding elements 130. This may include connections to smartphone applications and the like. More generally, the communications interface 164 may be suited such that any of the components of the system 1000 can communicate with one another. Thus, the communications interface 164 may be present on one or more of the components of the system 1000. The communications interface 164 may include, or be connected in a communicating relationship with, a network interface or the like. The communications interface 164 may include any combination of hardware and software suitable for coupling the components of the system 1000 to a remote device (e.g., a computing device 160 such as a remote computer or the like) in a communicating relationship through a data network 108. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 150 may be configured to control participation by the components of the system 1000 in any network to which the communications interface 164 is connected, such as by autonomously connecting to the data network 108 to retrieve status updates and the like.

The system 1000 or device 100 may include other hardware 180. In certain implementations, the other hardware 180 may include a camera affixed to the housing 110. The camera may allow a user to view the device 100 (or a field of view of the device 100) in real-time, or to view recorded information from a previous operation of the device 100, where such information may be stored on the memory 154. This can enable a user to gauge the performance of the device 100.

The other hardware 180 may also or instead include a power source. The power source may be any known in the art or that will become known in the art. For example, power sources may include an AC to DC converter (e.g., grid power), solar power, battery power, wind power, fossil fuel sourced power, and so on.

The other hardware 180 may also or instead include input devices such as a keyboard, a touchpad, a computer mouse, a switch, a dial, a button, and the like, as well as output devices such as a display, a speaker or other audio transducer, light emitting diodes or other lighting or display components, and the like. Other hardware 180 of system 1000 may also or instead include a variety of cable connections and/or hardware adapters for connecting to, e.g., external computers, external hardware, external instrumentation or data acquisition systems, and the like.

In certain implementations, the device 100 may "protect" a certain area/volume, which may be referred to herein as the "defended area." The defended area may be bounded by the range of one or more of the positioning mechanism 120, the range-finding elements 130, and the projectile launcher 140. The defended area may also or instead be set or adjusted by a user, e.g., using the user interface 162 or the controller 150.

Figure 2:
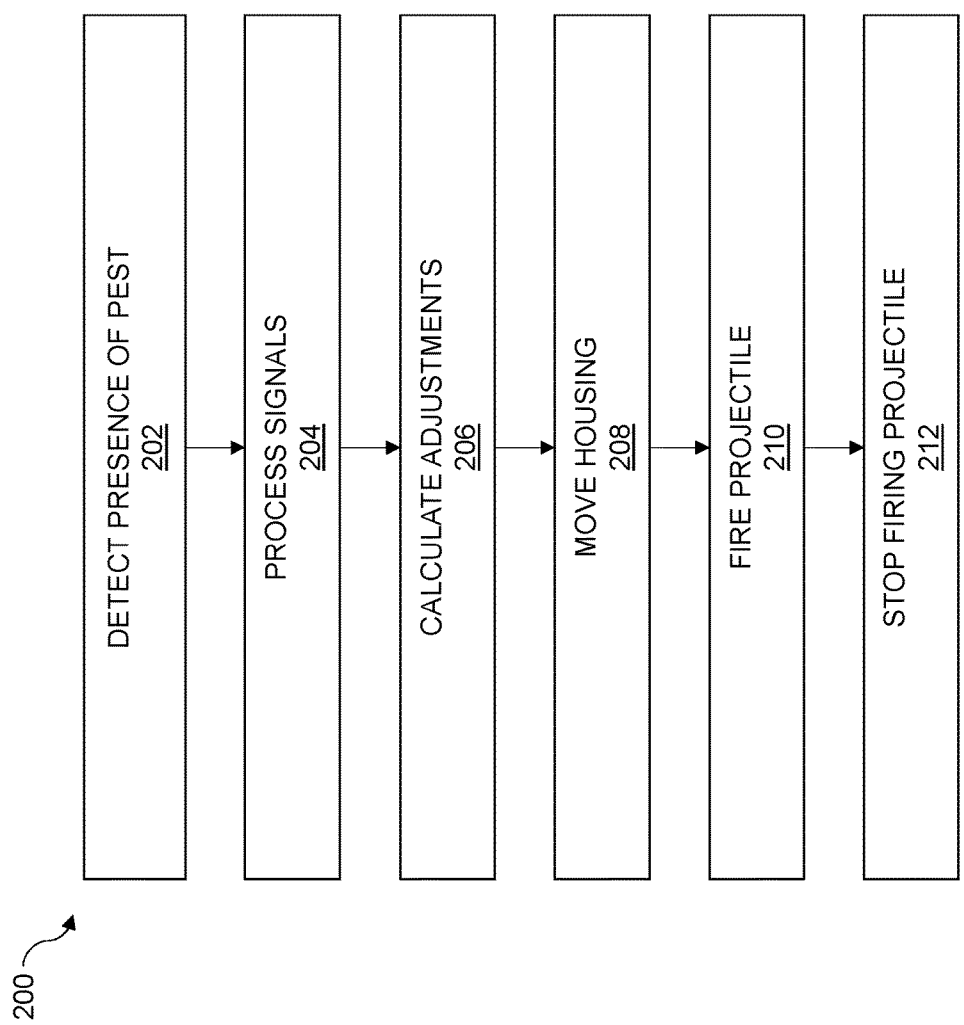
FIG. 2 is a flow chart of a method for repelling pests, in accordance with a representative embodiment.

FIG. 2 is a flow chart of a method for repelling pests, in accordance with a representative embodiment. The method 200 may be performed by any of the devices and systems described herein, e.g., such as the device 100 and system 1000 shown in FIG. 1 above.

As shown in box 202, the method 200 may include detecting a presence of a pest using at least three range-finding elements affixed to a housing along a common plane. The presence of the pest may be detected by obtaining one or more signals indicative of a location of the pest from each of the range-finding elements.

As shown in box 204, the method 200 may include processing the signals using a processor of a controller. Processing the signals may include measuring a strength of one or more of the signals and calculating a position of the pest based on the strength.

As shown in box 206, the method 200 may include calculating for adjustments in elevation based on a distance between the housing and the pest, and moving the housing using the positioning mechanism according to the calculated adjustments in elevation. The method 200 may also or instead include calculating for other adjustments, e.g., based on environmental factors such as weather, altitude, and so forth, based on movement of the pest or other attributes of the pest, or based on other factors and parameters. The housing may, in turn, be positioned using these calculated adjustments.

As shown in box 208, the method 200 may include moving the housing along one or more of an x-axis, a y-axis, and a z-axis using a positioning mechanism according to the calculated position of the pest (and any calculated adjustments) until the strength of one or more signals obtained by the range-finding elements is substantially equal.

As shown in box 210, the method 200 may include firing one or more projectiles from a projectile launcher affixed to the housing. The projectile launcher may be disposed on the housing such that the projectile launcher is directed toward the pest when the strength of the signals obtained by the range-finding elements is substantially equal, or a predetermined number of signals is substantially equal.

As shown in box 212, the method 200 may include stopping the firing of the projectile when a null response indicating an absence of the pest is received from one or more of the range-finding elements. For example, a high-speed pulsed water stream may continue until the range-finding elements (e.g., ultrasonic elements) receive a null response indicating the absence of the pest. In another implementation, a high-speed water stream may be substantially continuous.

In certain implementations, the device may track a pest should the pest move but not leave a defended area. For example, the device may continue to provide a high-speed pulsed water stream until a null response is reached, indicating the absence of the pest. In yet another implementation, the device may continue to provide a high-speed continuous water stream until the null response is reached, indicating the absence of the pest.

Initial set up of the devices or systems described herein may include adjustment for the condition where the range-finding elements (e.g., ultrasonic, radar, or laser sensors) detect a null, or no pest background. A sequence of operation for the devices or systems described herein may include one or more of the following:

1. A pest enters the field of view of a device.
2. The range-finding elements/sensors generate output signals.
3. The positioning processor measures the output signal of all sensors and calculates the direction to position the device.
4. The pointing processor adjusts the positioning motors until the sensors have an equal output signal, where the pointing processor and the positioning processor may be the same or different processors.
5. The pointing processor calculates for adjustments in elevation based on a distance to the pest.
6. The positioning motors of the positioning mechanism engage to adjust the elevation angle of the device.
7. The projectile launcher (e.g., liquid jet) is engaged to fire at the pest.
8. The positioning processor makes adjustments for the presence of the liquid jet.
9. Once the pest departs and the null background is attained again, the liquid jet is turned off The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A device for repelling pests, comprising:
   a housing;
   a positioning mechanism structurally configured to move the housing along one or more of an x-axis, a y-axis, and a z-axis;
   at least three range-finding elements affixed to the housing along a common plane, each of the at least three range-finding elements configured to detect a presence of a pest by obtaining a signal indicative of a location of the pest relative to the device;
   a projectile launcher affixed to the housing, the projectile launcher structurally configured to fire one or more projectiles therefrom; and
   a controller comprising a processor, the controller electronically coupled to the at least three range-finding elements, the positioning mechanism, and the projectile launcher, the controller configured to move the housing using the positioning mechanism along one or more of the x-axis, y-axis, and z-axis until a strength of the signal obtained from each of the at least three range-finding elements is substantially equal thereby indicating that the projectile launcher is directed toward the location of the pest, and the controller configured to fire the one or more projectiles from the projectile launcher when the projectile launcher is directed toward the location of the pest.

2. The device of claim 1, where the at least three range-finding elements are aligned in a substantially triangular configuration on the housing.

3. The device of claim 1, where a position of the projectile launcher relative to the at least three range-finding elements on the housing is predetermined such that, when the signal obtained from each of the at least three range-finding elements is substantially equal, the projectile launcher is directed toward an origin of the signal, the origin of the signal representing the location of the pest.

4. The device of claim 1, where the projectile launcher is aligned to fire the one or more projectiles substantially orthogonal to the common plane of the at least three range-finding elements.

5. The device of claim 1, where the controller is configured to fire the one or more projectiles from the projectile launcher until each of the at least three range-finding elements receives a null response indicating an absence of the pest.

6. The device of claim 1, where one or more of the at least three range-finding elements comprises an ultrasonic sensor, and where the signal comprises an ultrasonic signal.

7. The device of claim 1, where one or more of the at least three range-finding elements comprises a Doppler radar configured to detect rotating blades of a drone.

8. The device of claim 1, where one or more of the at least three range-finding elements comprises at least one of a visible light range-finding element, an infrared laser range-finding element, and a radio frequency range-finding element.

9. The device of claim 1, further comprising a user interface in communication with the controller to adjust a sensitivity of the at least three range-finding elements.

10. The device of claim 1, further comprising a user interface in communication with the controller to calibrate the device such that, when the signal obtained from each of the at least three range-finding elements is substantially equal, a distance of the pest from the projectile launcher is within a predetermined range of the projectile launcher.

11. The device of claim 1, where the one or more projectiles comprises a fluid.

12. The device of claim 11, where the fluid comprises one or more of a continuous stream of water, a pulsed stream of water, a continuous stream of oil, and a pulsed stream of oil.

13. The device of claim 11, further comprising a water supply in engagement with the projectile launcher.

14. The device of claim 1, where the one or more projectiles comprises pellets.

15. The device of claim 1, where the controller is disposed on the housing.

16. The device of claim 1, where one or more of the controller and a user interface in communication with the controller is disposed on an external component in communication with the device over a data network.

17. The device of claim 1, further comprising a camera affixed to the housing.

18. A method for repelling pests, comprising:
    detecting a presence of a pest using at least three range-finding elements affixed to a housing along a common plane, where the presence of the pest is detected by obtaining one or more signals indicative of a location of the pest from each of the at least three range-finding elements;
    processing the one or more signals using a processor of a controller, the processing comprising measuring a strength of the one or more signals and calculating a position of the pest based on the strength;
    moving the housing along one or more of an x-axis, a y-axis, and a z-axis using a positioning mechanism according to the calculated position of the pest until the strength of the one or more signals obtained by the at least three range-finding elements is substantially equal; and
    firing one or more projectiles from a projectile launcher affixed to the housing, the projectile launcher disposed on the housing such that the projectile launcher is directed toward the pest when the strength of the one or more signals obtained by the at least three range-finding elements is substantially equal.

19. The method of claim 18, further comprising calculating for adjustments in elevation based on a distance between the housing and the pest, and moving the housing using the positioning mechanism according to the calculated adjustments in elevation.

20. The method of claim 18, further comprising stopping the firing of the one or more projectiles when a null response indicating an absence of the pest is received from each of the at least three range-finding elements.

* * * * *